United States Patent [19]

Baehr et al.

[11] Patent Number: 4,961,216
[45] Date of Patent: Oct. 2, 1990

[54] TELEPHONE ANSWERING AND PAGING SYSTEM

[76] Inventors: G. Geoffrey Baehr, 23800 Hawthorne Blvd., Torrance, Calif. 90505; Bert P. Rosenthal, 2001 Santa Monica Blvd., Suite 685W., Santa Monica, Calif. 90404

[21] Appl. No.: 292,221

[22] Filed: Dec. 30, 1988

[51] Int. Cl.⁵ ........................ H04M 1/65; H04M 3/50
[52] U.S. Cl. ........................... 379/57; 379/67; 379/89
[58] Field of Search ............ 379/56, 58, 61, 57, 379/67, 88, 89, 201, 210, 211, 212, 214

[56] References Cited

U.S. PATENT DOCUMENTS

| | | | |
|---|---|---|---|
| 4,313,035 | 1/1982 | Jordan et al. | 379/61 |
| 4,571,457 | 2/1986 | Hattori et al. | 379/56 |
| 4,625,081 | 11/1986 | Lotito et al. | 379/88 |
| 4,696,054 | 9/1987 | Tsugei et al. | 455/89 |
| 4,731,811 | 3/1988 | Dubus | 379/58 |
| 4,768,221 | 8/1988 | Green et al. | 379/67 |
| 4,800,583 | 1/1989 | Theis | 379/67 |
| 4,811,379 | 3/1989 | Grandfield | 379/57 |
| 4,814,763 | 3/1989 | Nelson | 340/825.44 |

FOREIGN PATENT DOCUMENTS

| | | | |
|---|---|---|---|
| 3329267 | 2/1985 | Fed. Rep. of Germany | 379/58 |
| 0001648 | 1/1972 | Japan | 379/58 |
| 0191541 | 11/1983 | Japan | 379/58 |
| 0077539 | 5/1985 | Japan | 379/58 |
| 0081821 | 4/1987 | Japan | 379/58 |

*Primary Examiner*—James L. Dwyer
*Attorney, Agent, or Firm*—Harris, Kern, Wallen & Tinsley

[57] ABSTRACT

A telephone answering system for receiving calls from a caller and forwarding caller information to an owner's telephone. An automatic message center which provides instructions to a caller via the owner's outgoing message, receives and stores the caller's telephone number and information on the substance of the call, and then provides a second outgoing message on a telephone line to the owner via a pager or a handset providing the owner with the telephone number of the caller and a coded substance message.

14 Claims, 2 Drawing Sheets

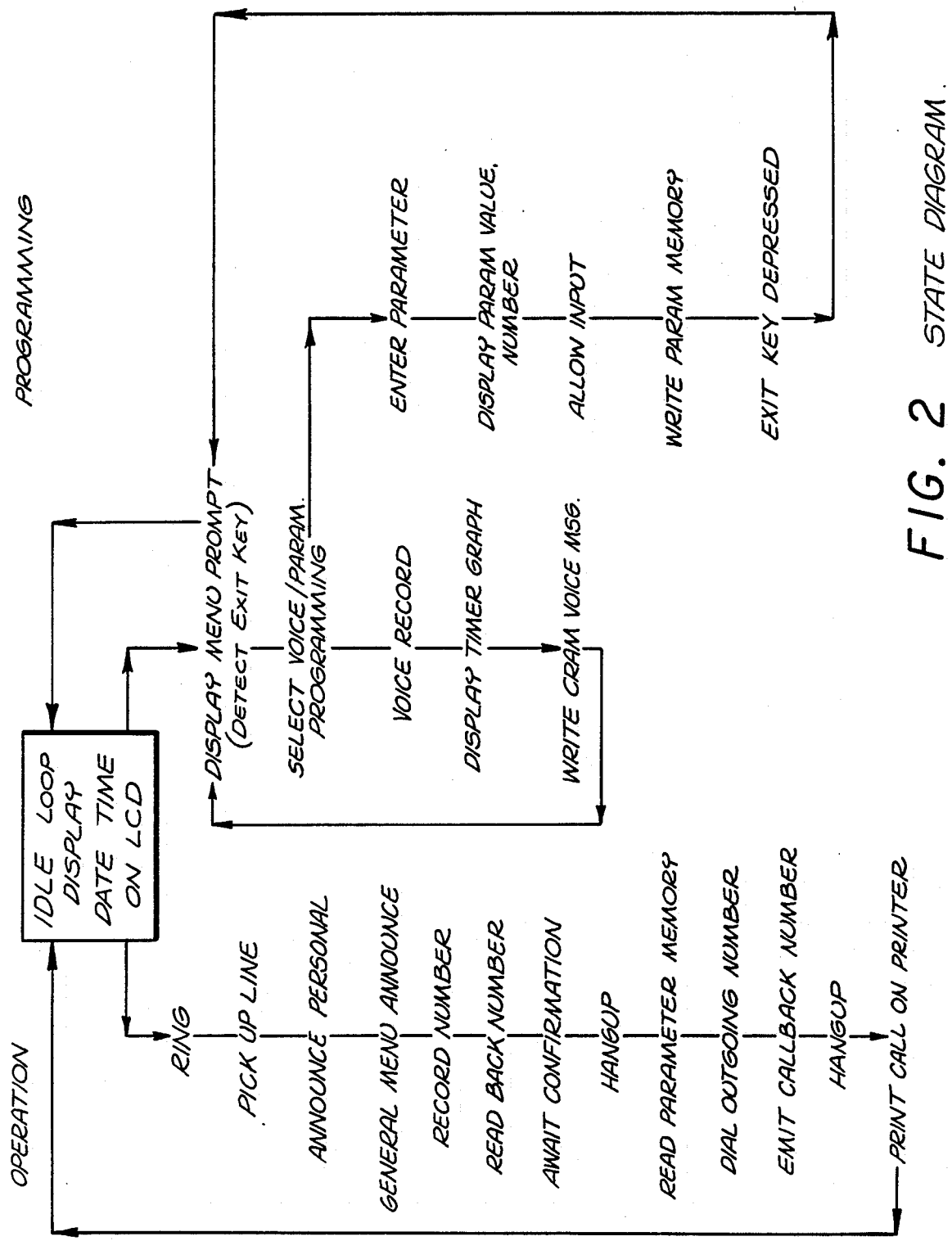
FIG. 2 STATE DIAGRAM.

TELEPHONE ANSWERING AND PAGING SYSTEM

BACKGROUND OF THE INVENTION

This invention relates to an automatic telephone answering system which will receive calls from a caller and forward caller information to an owner via a telephone line to a telephone pager or a telephone handset.

At the present time, many people, particularly doctors, use a telephone answering service. A caller trying to contact the doctor places a call to the doctor's telephone number. The call is answered by an operator who takes down the callers name and number and the substance of the caller's message. The doctor may call in to the operator from time to time to receive messages. Alternatively, the operator may call the doctor at a number provided by the doctor or may use a radio pager which in a simple version alerts the doctor to call the operator, and in more sophisticated versions, provides the doctor with the caller's identification.

These arrangements which require an operator have had a number of problems. They are relatively expensive in that one or more operators must be on hand at all times. Also, the operator may garble the message or the message may be delayed in transmission onward to the doctor while the operator is handling other incoming calls. This can be a particular problem when a single operator is handling a number of clients.

It is an object of the present invention to provide a new and improved telephone answering system which will automatically receive messages from callers and forward the messages onward to the doctor or other user of the system, without requiring attendance by an operator. Another object is to provide such a system which is inexpensive and simple to operate and which can be acquired, installed and operated by a the owner. The system may be shared by other users, if so desired.

Other objects, advantages, features and results will more fully appear in the course of the following description.

SUMMARY OF THE INVENTION

A telephone answering system for automatically receiving calls from a caller and forwarding caller information to an owners telephone alphanumeric display pager or direct to the owners telephone.

The system includes a telephone unit for connection to a telephone line, including means for answering a call on the line and placing a call on the line; a message storage unit; a message generation unit; connection means for connecting the telephone unit to the message storage unit for storing an outgoing message from the owner to a caller, and for connecting the message generation unit to the telephone unit for placing outgoing messages on the telephone line to a caller and to the owner; and control means for the connection means for sequentially transmitting an outgoing message as instructions to a caller, storing the caller's message, and transmitting the caller's message to the owner.

The preferred embodiment of the system also includes switch means for switching the system between an operation mode and a programming mode; a display unit for displaying a programming menu including voice recording and parameter recording; voice recording means for recording an owner's greeting menu message in the message storage unit; and data recording means for recording an owner's pager telephone number as a parameter in the message storage unit.

The term "owner" as used herein designates the party for whose benefit the system is being used, rather than the person holding title to the equipment.

BRIEF DESCRIPTION OF THE DRAWINGS

FIG. 2 is a state diagram of the system of FIG. 1.

DESCRIPTION OF THE PREFERRED EMBODIMENT

Figure 1:
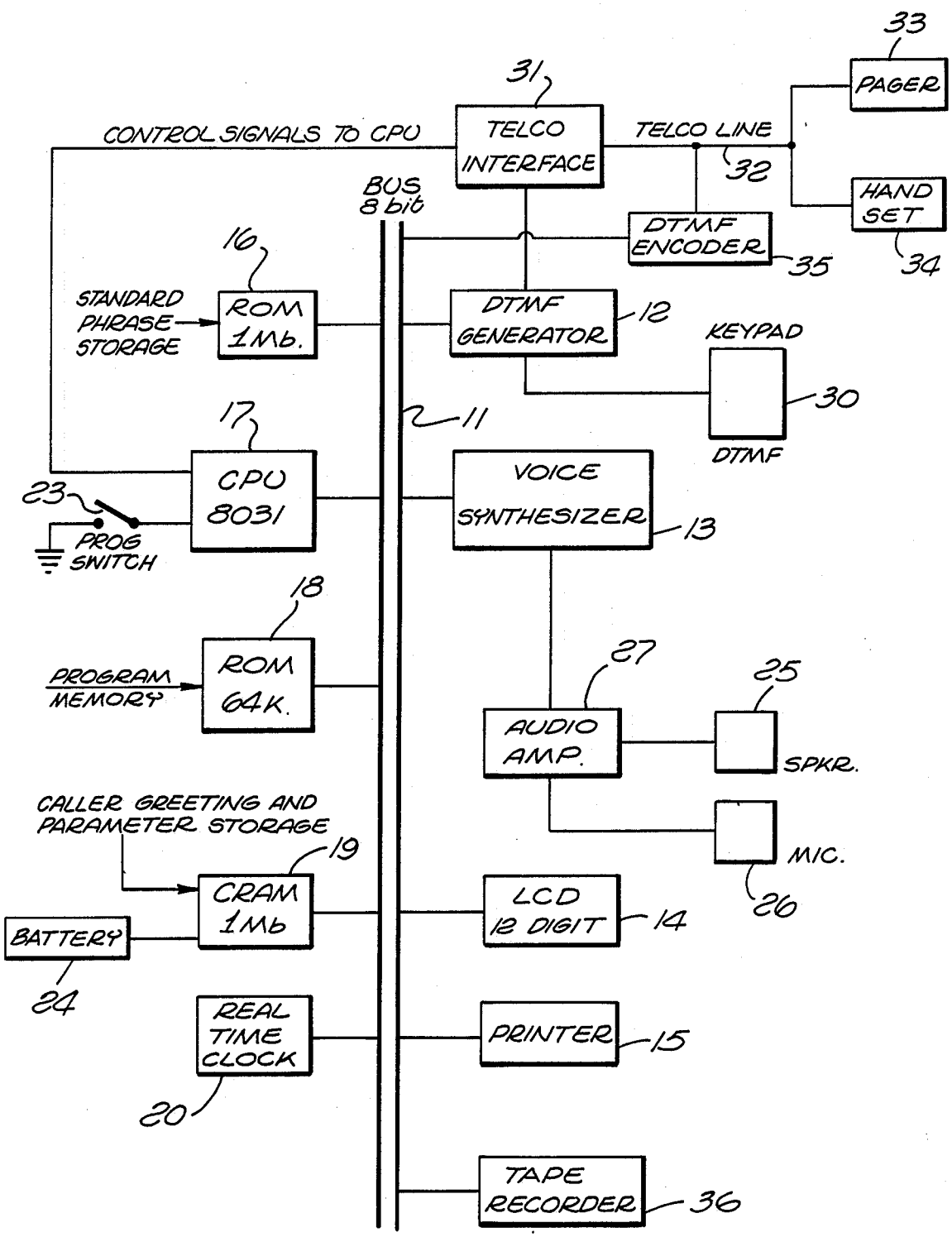
FIG. 1 is a block diagram of a telephone answering system incorporating the presently preferred embodiment of the present invention.

The system as shown in FIG. 1 includes a bus 11 with number of components connected thereto, including a dual tone multiple frequency (DTMF) generator 12, a voice synthesizer 13, a liquid crystal display (LCD) 14, a printer 15, a first read only memory (ROM) 16, a central processor unit (CPU) 17, a second ROM 18, a continuous random access memory (CRAM) 19, and a real time clock 20. The ROM 16 provides for standard voice phrase storage and the ROM 18 provides for program memory.

A switch 23 provides for switching the system between an operation mode and a programming mode, and is used by the owner when he or she wishes to change the owner's outgoing message and the stored parameters for system operation. The CRAM 19 provides for storage of the outgoing message to the caller and for the parameters. A battery 24 provides a backup power supply for the CRAM. An audio speaker 25 and an audio microphone 26 are connected to the voice synthesizer 13 through an audio amplifier 27.

A dual tone multifrequency (DTMF) touch tone keypad 30 is connected to the DTMF generator 12. A telephone interface unit 31 is connected between a telephone line 32 and the DTMF generator 12. The interface unit 31 is also connected to the CPU 17. The line 32 may be connected to a pager 33 or to a handset 34 or both as desired.

The system of FIG. 1 functions to provide an automatic interface between a conventional visual paging device or pager and the telephone network, replacing the widely used operator answering service. The components may be standard items presently available, but they are interconnected and interact in a new manner.

The telephone answering system has two operating modes, an operation mode and a programming mode. The operation mode is the normal mode for the system, handling incoming calls from callers and providing an outgoing message from the system owner. The term owner as used herein, identifies the person for whose benefit this system is being used, whether or not the person, typically a doctor, actually owns the equipment or rents or leases the equipment or subscribes to the use of the equipment.

In the operation mode, a person desiring to contact the owner calls the owner's telephone number on a conventional telephone line, which may be a wire line or a radio line or any other form of communication link. The system of the invention automatically answers the call and transmits a voice outgoing message to the caller, typically including a greeting and instructions to the caller for leaving a message. The caller may respond digitally by using a touch tone keypad, and typically leaves his or her telephone call back number and a code number or word indicating the nature of the call. By way of example, the outgoing message to the caller may include a severity code of one to nine for a party calling a doctor, with the severity code numbers including word descriptions of the condition being reported by the caller.

The caller's incoming message is stored, the caller hangs up, and the system is ready for receiving another call.

In the case of the caller not having a DTMF equipped telephone, the device may recognize an absence of DTMF signals within a specified period of time and prompt the user for a voice message only. This message may be recorded on a built in tape recording mechanism, and subsequently the owner can be notified by paging to call his device. Entry of an access DTMF digit sequence, presented as part of the standard answering sequence, will enter the external control menu, allowing the owner to remotely retrieve said messages.

After the caller hangs up, the system automatically places a call to the owner's number, stored as a parameter in the system, and transmits the caller's name and/or telephone number and, if used, severity code, on a telephone line to the owner or to a pager which then automatically transmits the outgoing message by radio to the owner. On receiving this message, the owner can place a call direct to the caller who left the message.

The step-by-step functioning of the system in the operation mode and in the programming mode is set out in the state diagram of FIG. 2 and also in the sections below.

Operation Mode
 a. Answer telephone using digitized voice recording of owner's greeting message.
 b. Prompt caller to enter the telephone number at which he or she desires to be called back, using DTMF tone signalling.
 c. Guide caller through digit entry using voice synthesized instructions, including error correction.
 d. Prompt caller for severity code, then read back number and code and wait for valid entry confirmation by digit entry by caller.
 e. Hangup.
 f. Dial pager telephone number.
 g. Emit number to be called back, and severity code if desired, to pager.
 h. Print time, date, number and code on printer.

Programming Mode
 a. Detect programming switch closed.
 b. Enter programming mode.
 c. Detect voice programming or parameter programming.
 d. If parameter programming, prompt programmer for data using LCD display of parameter.
 e. Record pager number keyed in by owner, access routine for desired pager, if desired.
 f. Set time and date, if desired.
 g. Verify correct data to LCD, exit from this mode.
 h. If voice programming, start digital voice recorder.
 i. Display bar graph of time elapsed on LCD.
 j. Store data in Voice CRAM area, exit from this mode.

Remote Programming Capability

A remote programming feature allows the owner to remotely program the device's parameters from any telephone. Such a feature may be used to switch owner's callback numbers, thereby allowing two or more owners to alternate which receives the calls from the device, such as for a shift change.

Multiple User Access

An expansion feature of the device prompts the caller for an owner's identification. Upon receiving this identification, the data message received is directed to the specified owner, thereby allowing multiple owners to share one device.

Calling Number Detection

Capability has been designed into the device to allow direct connection to telephone company switching centers. Contingent on permission, the device may be enabled to automatically determine and display the callers number, using data supplied by the telephone company.

Functional Description

The preferred embodiment of this telephone answering system is designed around an 8031 single chip microprocessor unit CPU 17. This CPU is controlled by a stored program contained in 64k of ROM 18.

Using an 8 bit data bus 11, the CPU controls a telephone interface 31 and is interrupted by that interface when a call arrives. The interrupt causes the CPU to pick up the line and begin the answer sequence.

The voice synthesizer 13 is an analog-to-digital voice synthesizer with 1 megabit of continuous random access memory 19 attached. The owner's greeting message may be read into this memory at setup, to be played back as part of the greeting message to the caller. This read back is part of the answer sequence. Voice is digitized at several rates from 32 to 7.5 kbit/sec, thereby allowing a total message time of 30 seconds to 2 minutes, depending on quality desired.

The caller is stepped through a synthesized voice sequence of instructions and prompted to leave his or her callback number by using DTMF tones. These voice prompting messages are stored in 1 Mb of ROM 16.

Caller number input data is decoded by a DTMF decoder 35 and stored into a temporary memory 19 for later use.

Dialing of the outgoing number is performed by a DTMF encoder generator 12 and monitored by a call progress detector, included in the telephone interface circuitry 31.

The stored telephone number for a voice pager or for a direct line to the owner, as set by the owner, along with access codes etc, is located in parameter memory of the 1mb CRAM 19 parameter memory.

The progress and success of the call is printed on a built in 20 column dot matrix printer 15 for reference by the owner. Data printed includes date, time and number called.

Programming of the device is accomplished using the DTMF keypad 30 and the LCD display 14 located on the front of the device. Parameters and their values are displayed on the LCD and the keypad is used to enter data for each parameter. Each parameter is stored in parameter memory 19. Entering the programming state is accomplished by closing the programming enable switch 23, which action is detected by the CPU, and the programming routine is entered. Space is provided in the parameter memory 19 for expansion in the number of parameters stored, in order to accommodate multiple users (owners) of one device, such as a medical group or practice.

All I/O devices are accessed through I/O ports, and memory mapped I/O is not used in the device. Each functional subcomponent is accessed as an I/O port.

Interrupts generated include ring detect and voice message end. All other I/O is performed by polling mechanisms.

The step-by-step functioning for the remote programming mode is set out below.

5

The step-by-step functioning for the remote programming mode is set out below.

Remote Programming Mode a. Answer phone.
    b. Deliver greeting.
    c. Detect access codes.
    d. Prompt for function:
        1. Enter/switch to new owner number.
        2. Record new voice message.
        3. Playback voice only message.
    e. Perform action.
    f. Prompt for new action/hangup command.
    g. Hangup.

Pseudo Code Software Description

```
Main Loop
    Write Real time Clock data to LCD
    Detect Ring
        Call Answer Service
    Detect Programming Switch Closed
        Call Programming Service
Answer Service
    Seize Telco line
        set seize line to telco inlf
    Primary Message Announce
        Clear Voice Synth (V/S)
        Index V/S to personal message area start CRAM
        Trigger V/S
    General Instruction Announce
        Read Param RAM for location of General Message
```

```
            Index VS to general instruction message 0
                Read Message
            Increment param msg pointer
                Read Message
                    end bit set in param ?
                        continue
                    else
                            call increment param msg
                            pointer Read DTMF data
    Read incoming DTMF digit from line
        write into temp scratch ram
        increment digit pointer
    End digit detected? (#) or number digits >12
        call Replay number
    Error digit detected
        decrement digit pointer
        call read DTMF Data
    Valid digit?
        call Read incoming DTMF digit from line
        else
            return
Replay number
    Set pointer to first digit
        Lookup value of contents in V/S vocab table
    Index V/S to vocab item location
        Read Message
    Index VS to "any error" message
        Read message
    Detect DTMF error digit
        Error yes?
            call Error message
            call read DTMF data
        else
            continue
    Set VS to closing message
    Read closing message
```

Severity Code
    Set VS to severity code msg
    Trigger VS
    call Read DTMF data from line
        write to scratchpad
    call Replay number
    Set VS to closing message
    Read closing message
Hangup
    Set drop line to Telco interface
Call Out
.   Seize line
        Set seize bit to telco interface
    Read Param RAM for digit
        Write digit to DTMF encoder
    Increment digit pointer to next
        Last Digit yes?
            call access code
        else
            increment digit pointer
            call Write digit to DTMF
    Read param RAM for access code
        Access code no ?
            call Read Scratchpad for Digit
        else
            Set pointer to first digit
            Call Write digit to DTMF
            Last digit yes?
                exit
            else
                increment digit ptr
                call Write digit to DTMF
    Read scratchpad for digit of number to call back
        Call Write digit to DTMF
        Increment digit ptr
            Last Digit yes?
                call Write severity code
            else

```
            increment ptr
            call Write digit to DTMF
Send Severity code
        index to severity code scratch memory location
        Call Write digit to DTMF
        Hangup
            set drop line bit to telco
        Print
            set ptr to 1st scratch digit
                write to printer
            increment ptr
                write to printer
            read Real time clock
                write to printer
            read severity code
                write to printer
        Display time
            call Idle Programming
    Detect programming switch closed
        check prog switch mask bit
        closed?
            call prog
        else
            return
    Prog
        Emit prompt
            set LCD to display voice/param prog
        Read Keypad DTMF, 1=Voice, 2=Param, 3=End
        Voice yes?
            call voice prog
        else
            call param prog
```

```
Voice prog
    Display voice prog char on LCD
    Scan keypad for start digit (*)
    Start?
        set ptr to start of personal announce CRAM
        Digitize voice to CRAM
            Display bar chart
                increment bar chart  1/sec
        Scan keypad for end digit (#)
        Stop digitizer
    else
        reset VS
        call Prog
Param Prog
    set param ptr to param 0
    display contents param 0 on LCD
        write contents to LCD
    Scan keypad
        Entry is data ?
            write to param area 0
            increment param ptr
            call Scan keypad
        Entry is end data entry digit ? (#)
            incr param ptr to next param
            call Scan keypad
        Entry is end prog digit*
            return keypad.
```

We claim:

1. In a telephone answering system for connection to a telephone line for operation between a telephone system customer and a pager for receiving calls from a caller through the telephone system and forwarding caller information to an owner through the telephone system and the pager, the combination of:
   a telephone unit for connection to said telephone line, including means for automatically answering a call on the line and automatically placing a call on the line;
   a message storage unit;
   a message generation unit;
   connection means for connecting said telephone unit to said message storage unit for storing an outgoing message from the owner to a caller, and for connecting said message generation unit to said telephone unit for placing outgoing messages on the telephone line to a caller through said telephone system and outgoing messages on the telephone line to the owner through said pager; and
   control means for said connection means for automatically and sequentially transmitting an outgoing voice message as instructions to a caller, storing the caller's message, and transmitting the caller's message to said telephone line for transmission to the owner through said pager;
   said message storage unit including means for storing an outgoing message to the caller in the form of a menu of possible items for selection by the caller, and means for storing the caller'telephone number and menu selection in digital form as transmitted by the caller by DTMF tones for subsequent transmission to the owner through said pager.

2. A system as defined in claim 1 including a voice synthesizer unit for connection to said telephone unit for transmitting an outgoing message to a caller in voice form.

3. A system as defined in claim 1 wherein said message storage unit includes:
means for storing the owner's telephone number for inclusion in the outgoing message to the owner; and
means for changing said owner's telephone number.

4. A system as defined in claim 4 wherein said menu includes a caller message code in digital form:
said message storage unit includes means for storing the caller message code as part of the caller's message; and
said message generation unit includes means for generating the caller message code as part of the message transmitted to the owner.

5. A system as defined in claim 1 including a printing for printing a record of the incoming message from the caller and the outgoing message to the owner.

6. A system as defined in claim 1 including:
switch means for switching said system between an operation mode and a programming mode;
display unit for displaying a programming menu including voice recording and parameter recording;
a voice recording means for recording an owner's outgoing message in said message storage unit; and
data recording means for recording an owner's telephone number as a parameter in said message storage unit.

7. A system as defined in claim 7 wherein said voice recording means includes a microphone and an audio amplifier.

8. A system as defined in claim 8 wherein said voice recording means includes a speaker for playback of the stored owner's outgoing message.

9. A system as defined in claim 9 wherein said data recording means includes a touchtone key pad and DTMF generator for inputting parameters to said message storage unit.

10. A system as defined in any of claims wherein said owners telephone is a telephone pager.

11. A system as defined in any of claims wherein said owners telephone is a telephone handset.

12. A method of operating a telephone answering system for connection to a telephone line for operation between a telephone system customer and a pager for receiving calls through the telephone system on a telephone line from a caller and forwarding caller information to an owner through the telephone system via a telephone line and the pager, including the steps of:
storing the owners outgoing message to a caller in a message storage unit including a menu of possible items for selection by the caller;
automatically answering a call from a telephone system customer on the line;
automatically placing the owners outgoing voice message on the telephone line to the caller;
storing the caller'message transmitted by DTMF tones in a message storage unit, including the caller's telephone number and menu selection if digital form as a part of the caller's message; and
automatically transmitting the caller's message to the telephone line to the pager through the telephone system for transmission to the owner.

13. The method as defined in claim 12 including the steps of:
providing a caller message code in digital form in the menu;
storing the caller message code as part of the caller's message; and
generating the caller message code as part of the message transmitted to the owner.

14. The method as defined in claim 12 including the steps of:
switching the system between an operation mode and a programming mode;
displaying a programming menu for the owner;
recording the owners outgoing message in audio form in the message storage unit; and
recording the owners telephone number as a parameter in digital form in the message storage unit.

* * * * *